May 19, 1970     D. R. WILSON     3,512,748

FLUID-FLOW CONTROLLER

Filed Aug. 14, 1967

INVENTOR.
DONALD R. WILSON

BY
*A. C. Smith*

ATTORNEY

United States Patent Office 3,512,748
Patented May 19, 1970

3,512,748
FLUID-FLOW CONTROLLER
Donald R. Wilson, Santa Cruz, Calif., assignor to Pacific Plantronics, Inc., Santa Cruz, Calif., a corporation of California
Filed Aug. 14, 1967, Ser. No. 660,360
Int. Cl. F16l 55/14
U.S. Cl. 251—8                          2 Claims

ABSTRACT OF THE DISCLOSURE

A resilient porous insert is disposed within a flexible fluid-confining tube at a location therein adjacent to a clamp which is arranged to alter the cross-sectional area of the internal bore of the tube for altering the flow of fluid through the tube.

BACKGROUND OF THE INVENTION

Certain inexpensive means for controlling the flow of fluid under pressure of about 50 to 75 centimeters of water and at flow rates typically of 2 to 300 cubic centimeters per hour rely upon the pinching of a flexible, fluid-confining tube to introduce a constriction in the internal bore of the tube. In medical applications of such fluid-flow controllers of intravenous infusion sets, the materials which contact the fluid must be biologically inert and sterile to avoid contaminating the fluid in the tube, and the possibility of air leakage must be extremely low. Tubes made of surgical-grade latex rubber or plastics such as poly-vinylchloride, or the like, have been used with adjustable clamps that pinch the tube and alter the flow of fluid therethrough. However, fluid-flow controllers of this type are usually difficult to adjust down to very low flow rates and typically change flow rate characteristics with time as the tube material cold flows to shape about the clamp.

SUMMARY OF THE INVENTION

Accordingly, the present invention provides a porous insert within the internal bore of the fluid-confining tube in the region of a pinch clamp to ensure uniform distortion of the internal bore as the tube is pinched and to avoid cold flow of the tube material into the open cross section of the tube in the region of the constriction.

DESCRIPTION OF THE PREFERRED EMBODIMENT

Figure 1:
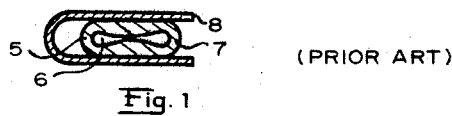
FIG. 1 is a sectional view of a conventional pinch-type flow regulator known in the prior art and FIG. 2 is a graph showing typical flow-vs.-time characteristics of the conventional device of FIG. 1.
Figure 2:
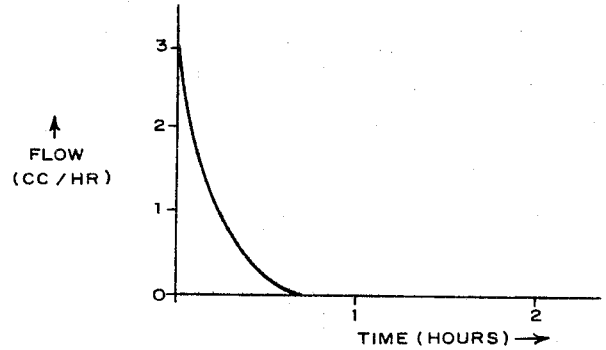

Referring now to the conventional pinch-type fluid-flow controller of FIG. 1, there is shown in sectional view a tube 5 of biologically inert material such as poly-vinylchloride plastic or latex rubber pinched between the upper and lower portions of a clamp 8. This clamp is typically a thin metal element which is folded over the tube 5 for an inch or two along the tube 5 and which is bent by hand in the plane of a diameter of the tube 5 to pinch the tube as shown at the corner of the angle-shaped element 8 thus formed. This tends to press the inner walls of the tube together at the center leaving only tiny passages 6 and 7 at the extreme ends of the flattened tube 5. Thus, once the clamp 8 is properly bent to flatten the tube 5 as shown for providing a selected fluid flow rate, say about 3 cm.³ per hour, any cold flow of the tube material with time in response to the pinching effect of the clamp tends to alter the size of the tiny passages 6 and 7. However, minute changes in the size or shape of the passages 6 and 7 may cause a substantial change in the fluid flow rate because of the capillary forces in these tiny passages. The graph of FIG. 2 shows the typical flow characteristic with time of such a conventional fluid-flow controller after being set to an initial flow rate of 3 cm.³ per hour. It is believed that the complete cessation of fluid flow therethrough within a period typically less than one hour is due primary to the cold flow of the tube material, as previously discussed. A variety of squeezing devices have been used in the prior art with similar flow characteristics to that shown in FIG. 2. Needle valve type flow adjusters have not been extensively used in the prior art because of the possibility of air leakage of the system which is to be avoided in intravenous infusion equipments.

Prior attempts to overcome the disadvantages of the cold flow of the tube material have resulted in the use of more resilient material such as latex rubber. However, the natural resilience of this material makes very fine adjustment of the fluid flow rate extremely difficult and the addition of fillers and additives to the latex rubber to decrease its resiliency tends to increase its propensity to cold flow in a pinch-type clamp with the concomitant disadvantages previously discussed.

Figures 3, 4:
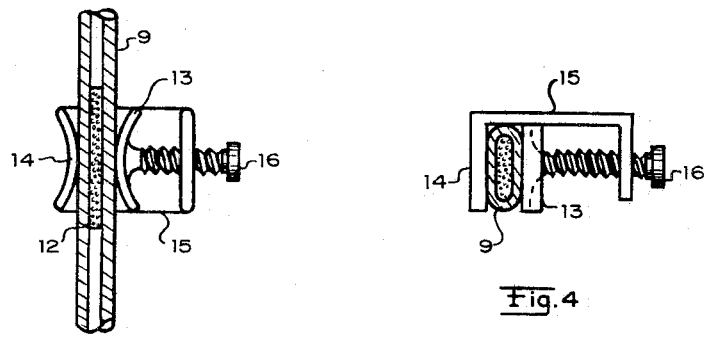
FIG. 3 is a plan-sectional view of the fluid-flow controller of the present invention showing the porous insert in the internal bore of the tube.
FIG. 4 is an end-sectional view of the fluid-flow controller.

In the fluid-flow controller of the present invention, as shown in FIG. 3, a porous insert 12 is disposed within the tube 9 in the region of the clamp 15. This insert is typically biologically inert, open-cell material such as foam latex rubber or elasto-plastic foam such as polyurethane or silicone rubber having a substantially uniform cell density of about 25–50 cells per linear centimeter. In order to avoid problems of cold flow commonly associated with some resilient plastic materials, the preferred embodiment uses a latex rubber tube 9 and a foam latex insert 12 which is about 3 centimeters long and which is substantially centered in the clamp 15. The clamp 15 has a pair of arcuate pressure surfaces 13 and 14 which are disposed to pinch the tube 9 and insert 12 in response to rotation of thumbscrew 16. The length of the insert 12 for a liquid flow controller is preferably longer than the pressure surfaces 13 and 14 to ensure that any gas bubbles which may evolve from the liquid are entrapped within the insert 12 at an end thereof disposed away from the clamping region. The arcuate presure surfaces 13 and 14 ensure a smooth transition for fluid flow into and out of the constriction between the pressure surfaces and also provide adjustment of the number and size of a great many open-cell passages through the insert, and thereby control the flow of fluid in the tube 9.

Figure 5:
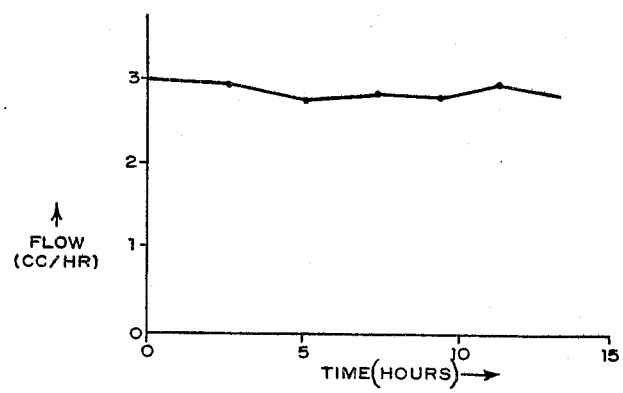
FIG. 5 is a graph showing the flow-vs.-time characteristics of the present invention.

FIG. 5 shows a typical graph of fluid flow-vs.-time provided by the controller of the present invention. In practice, flow controllers constructed as herein described provided continuous fluid flow control to within ten percent of an initial setting for periods of greater than ten hours.

Therefore, the fluid-flow controller of the present invention is a simple, inexpensive device which provides substantially constant fluid flow over long time periods, enables very fine adjustment of fluid flow rate to be made with ease and accuracy, and also preserves gas-tight integrity of the system.

I claim:

1. Intravenous fluid infusion flow control means comprising:
   a fluid-containing tube of biologically-inert material forming resilient walls that define an internal passage;
   an insert of resilient porous foam material having a plurality of interconnection cells disposed within the internal passage of said tube; and
   clamping means disposed about said tube at a location therealong adjacent said insert within the tube for decreasing the external dimension of the tube to decrease the cross-sectional area of the internal passage and of the interconnecting cells of said insert therein for establishing a rate of fluid flow therethrough that is representative of the decreased external dimension of the tube.

2. Intravenous fluid infusion flow control means as in claim 1 wherein said insert is foam material of interconnecting cell structure having a cell density of between about 25 and 50 cells per linear centimeter.

References Cited

UNITED STATES PATENTS

| | | | |
|---|---|---|---|
| 2,902,248 | 9/1959 | Barton | 251—8 |
| 3,167,299 | 1/1965 | Ling | 251—8 |
| 1,905,335 | 4/1933 | Bijur | 138—46 XR |
| 2,600,493 | 6/1952 | Farris. | |
| 3,010,613 | 11/1961 | Stossel | 222—214 XR |
| 3,113,568 | 12/1963 | Robins | 128—156 |
| 3,171,820 | 3/1965 | Volz | 260—2.5 |
| 3,174,654 | 3/1965 | Reiner | 222—214 |
| 3,273,849 | 9/1966 | Hansson | 251—4 |

HAROLD W. WEAKLEY, Primary Examiner

U.S. Cl. X.R.

128—214; 138—46; 251—205